United States Patent
Kumagai et al.

(10) Patent No.: US 10,712,153 B2
(45) Date of Patent: Jul. 14, 2020

(54) METHOD FOR CONTROLLING ULTRASONIC MOTOR AND SURVEYING INSTRUMENT FOR THE SAME

(71) Applicant: TOPCON CORPORATION, Tokyo (JP)

(72) Inventors: Kaoru Kumagai, Tokyo (JP); Satoshi Yanobe, Tokyo (JP); Tetsutaro Kouji, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 41 days.

(21) Appl. No.: 15/477,691

(22) Filed: Apr. 3, 2017

(65) Prior Publication Data

US 2017/0299386 A1 Oct. 19, 2017

(30) Foreign Application Priority Data

Apr. 15, 2016 (JP) .................. 2016-081768

(51) Int. Cl.

| | |
|---|---|
| *G01C 15/00* | (2006.01) |
| *H02N 2/14* | (2006.01) |
| *G01C 15/02* | (2006.01) |
| *G05B 7/00* | (2006.01) |
| *H02N 2/00* | (2006.01) |
| *H02N 2/16* | (2006.01) |

(52) U.S. Cl.
CPC .......... *G01C 15/00* (2013.01); *G01C 15/002* (2013.01); *G01C 15/02* (2013.01); *G05B 7/00* (2013.01); *H02N 2/00* (2013.01); *H02N 2/142* (2013.01); *H02N 2/163* (2013.01)

(58) Field of Classification Search
CPC ...... G01C 15/00; G01C 15/002; G01C 15/02; H02N 2/00; H02N 2/142; H02N 2/163
USPC ......................................................... 318/591
See application file for complete search history.

(56) References Cited

U.S. PATENT DOCUMENTS 3,634,792 A * 1/1972 Blomenkamp ........ B60Q 1/444
340/464
4,983,953 A * 1/1991 Page ...................... B60Q 1/447
340/467

(Continued)

FOREIGN PATENT DOCUMENTS

JP  2009-300386 A  12/2009
JP  2014-137299 A   7/2014

*Primary Examiner* — Eduardo Colon Santana
*Assistant Examiner* — Devon A Joseph
(74) *Attorney, Agent, or Firm* — Roberts Calderon; Safran & Cole P.C.

(57) ABSTRACT

Provided is a method for controlling an ultrasonic motor to reduce deterioration of automatic tracking performance, and a surveying instrument for the same. The present invention provides a method for controlling an ultrasonic motor in a surveying instrument including a rotary shaft, an ultrasonic motor that drives a rotary shaft, a tracking unit that includes a light emitting unit and a light receiving unit and tracks a target, and a clock signal oscillation unit that outputs a clock signal, wherein at the time of low-speed rotation of the ultrasonic motor, based on the clock signal, a ratio of an acceleration period in which a drive signal is applied and a deceleration period in which the drive signal is stopped in a drive cycle of the drive signal of the ultrasonic motor is set, and the light emitting unit is made to emit light in the deceleration period.

6 Claims, 10 Drawing Sheets

(56) References Cited

U.S. PATENT DOCUMENTS

| | | | | |
|---|---|---|---|---|
| 5,611,406 | A * | 3/1997 | Matsuzaki | B62D 1/28 |
| | | | | 180/167 |
| 5,933,661 | A * | 8/1999 | Kawanami | G03B 5/00 |
| | | | | 396/135 |
| 6,092,014 | A * | 7/2000 | Okada | G01P 15/00 |
| | | | | 340/438 |
| 7,002,459 | B1 * | 2/2006 | Escandon | B60Q 1/444 |
| | | | | 340/425.5 |
| 10,139,224 | B2 * | 11/2018 | Kamiki | G01C 9/20 |
| 2001/0045534 | A1 * | 11/2001 | Kimura | E02F 3/847 |
| | | | | 250/559.38 |
| 2002/0105621 | A1 * | 8/2002 | Kurematsu | H04N 5/7416 |
| | | | | 353/30 |
| 2003/0141466 | A1 * | 7/2003 | Ohtomo | G01C 15/002 |
| | | | | 250/559.38 |
| 2006/0250046 | A1 * | 11/2006 | Koizumi | A61B 8/12 |
| | | | | 310/317 |
| 2009/0303561 | A1 * | 12/2009 | Kiyama | G02B 26/122 |
| | | | | 359/198.1 |
| 2011/0031906 | A1 * | 2/2011 | Yasohara | G06F 13/4256 |
| | | | | 318/66 |
| 2012/0033025 | A1 * | 2/2012 | Kiyama | G02B 26/127 |
| | | | | 347/261 |
| 2013/0264983 | A1 * | 10/2013 | Okumura | H02P 23/22 |
| | | | | 318/400.26 |
| 2014/0196293 | A1 * | 7/2014 | Kodaira | G01C 15/002 |
| | | | | 33/227 |
| 2017/0160108 | A1 * | 6/2017 | Yanobe | G01C 3/08 |
| 2017/0309806 | A1 * | 10/2017 | Kumagai | B06B 1/0644 |
| 2017/0310248 | A1 * | 10/2017 | Kumagai | G01C 15/002 |

* cited by examiner

METHOD FOR CONTROLLING ULTRASONIC MOTOR AND SURVEYING INSTRUMENT FOR THE SAME

TECHNICAL FIELD

The present invention relates to a method for controlling an ultrasonic motor that drives a rotary shaft of a surveying instrument, and a surveying instrument for the same.

BACKGROUND ART

A surveying instrument, for example, a total station includes a telescope that collimates a measurement point, a bracket portion that supports the telescope rotatably in the vertical direction, and a base that supports the bracket portion rotatably in the horizontal direction. The telescope is driven by a vertical rotary motor provided on a vertical rotary shaft, and the bracket portion is driven by a horizontal rotary motor provided on a horizontal rotary shaft. Patent Document 1 discloses a surveying instrument adopting ultrasonic motors as the vertical rotary motor and the horizontal rotary motor.

Figure 10:
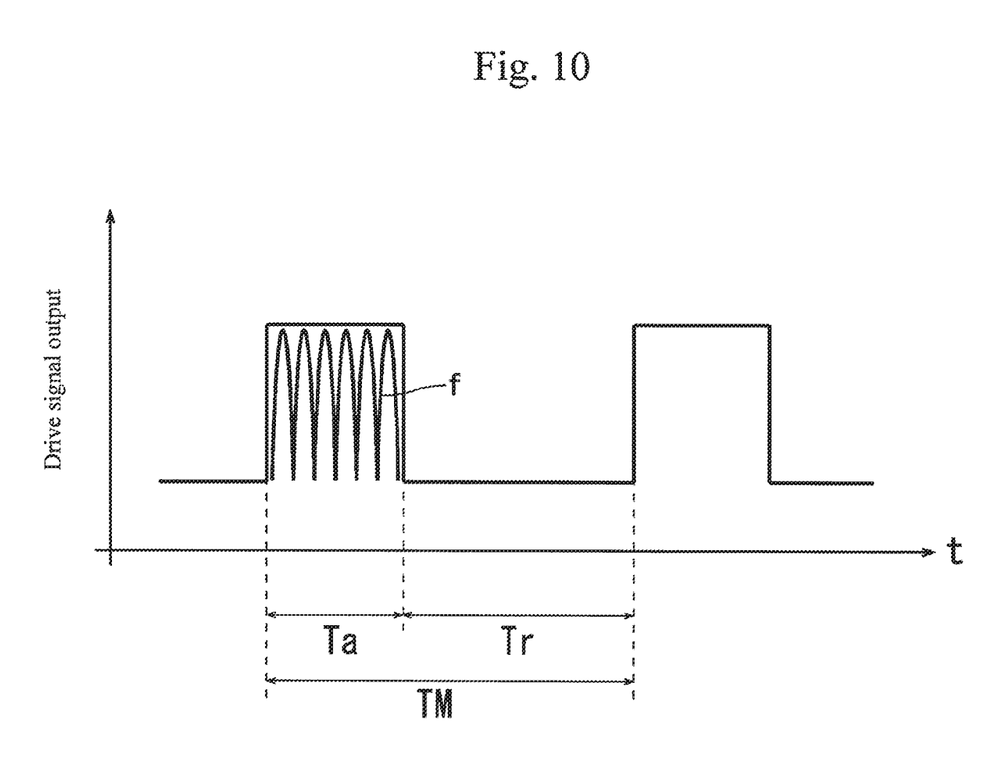
FIG. 10 is a waveform diagram of a drive signal showing intermittent driving of an ultrasonic motor.

It is difficult for an ultrasonic motor to rotate at a low speed during continuous driving. Therefore, at the time of low-speed rotation, as shown in FIG. 10, intermittent driving by turning ON/OFF a drive signal is performed. That is, in a drive cycle TM, an acceleration period Ta in which the drive signal is applied and a deceleration period Tr in which the drive signal is stopped are provided, and by changing a ratio of the acceleration period Ta and the deceleration period Tr, an average speed in the drive cycle TM is controlled.

Many surveying instruments have a function of automatically tracking a moving target as disclosed in, for example, Patent Document 2. There is a method for automatically tracking in which a surveying instrument is provided with a light emitting unit that irradiates tracking light and a light receiving unit that receives reflected light of the tracking light, a lighted image and an unlighted image are acquired and a difference between these is obtained, and a position with a deviation falling within a predetermined value from the center of a visual axis of the telescope is detected as a target position.

CITATION LIST

Patent Documents

[Patent Document 1] Japanese Published Unexamined Patent Application No. 2014-137299

[Patent Document 2] Japanese Published Unexamined Patent Application No. 2009-300386

SUMMARY OF THE INVENTION

Problems to be Solved by the Invention

In many cases of automatic tracking, in order to track a target that an operator carries, a rotary shaft is driven to rotate at a low speed of approximately 5 [°/s]. Therefore, the above-described intermittent driving is performed in an ultrasonic motor, however, a control response of the ultrasonic motor is quick, so that a speed corresponding to a drive frequency is quickly reached in the acceleration period Ta, and a stopped state is quickly reached in the deceleration period Tr. Thus, at the time of low-speed rotation of the ultrasonic motor, speed unevenness occurs, so that an image acquired by automatic tracking is blurred in some cases.

In particular, in a case where a distance between a target and the surveying instrument is long, a target image projected onto the light receiving unit becomes small, and a light amount per one pixel decreases due to an influence from heat haze, etc., and when the image is blurred, an S/N ratio of a light receiving signal lowers, and a problem in which tracking performance deteriorates occurs.

In order to solve the above-described problem, an object of the present invention is to provide a method for controlling an ultrasonic motor to reduce deterioration of automatic tracking performance in a surveying instrument adopting the ultrasonic motor for a rotary shaft, and a surveying instrument for the same.

Means for Solving the Problems

In order to solve the above-described problem, a method of controlling an ultrasonic motor according to an aspect of the present invention is a method for controlling an ultrasonic motor in a surveying instrument including a rotary shaft, an ultrasonic motor that drives the rotary shaft, a tracking unit that includes a light emitting unit and a light receiving unit and tracks a target, and a clock signal oscillation unit that outputs a clock signal, wherein at the time of low-speed rotation of the ultrasonic motor, based on the clock signal, a ratio of an acceleration period in which the drive signal is applied and a deceleration period in which the drive signal is stopped in a drive cycle of the drive signal of the ultrasonic motor is set, and the light emitting unit of the tracking unit is made to emit light in the deceleration period.

In the above-described aspect, it is also preferable that the light emitting unit is made to light in the deceleration period just before switching to the acceleration period.

In order to solve the above-described problem, a surveying instrument according to an aspect of the present invention includes a rotary shaft, an ultrasonic motor that drives the rotary shaft, a tracking unit that includes a light emitting unit and a light receiving unit and tracks a target, a clock signal oscillation unit that outputs a clock signal, and a control unit that, at the time of low-speed rotation of the ultrasonic motor, sets a ratio of an acceleration period in which the drive signal is applied and a deceleration period in which the drive signal is stopped in a drive cycle of the drive signal of the ultrasonic motor based on the clock signal, and makes the light emitting unit of the tracking unit emit light in the deceleration period.

In the above-described aspect, it is also preferable that the control unit makes the light emitting unit light in the deceleration period just before switching to the acceleration period.

Effect of the Invention

The present invention provides a method for controlling an ultrasonic motor to reduce deterioration of automatic tracking performance in a surveying instrument adopting the ultrasonic motor for a rotary shaft, and a surveying instrument for the same.

DESCRIPTION OF EMBODIMENTS

Next, a preferred embodiment of the present invention is described with reference to the drawings.

Figure 1:
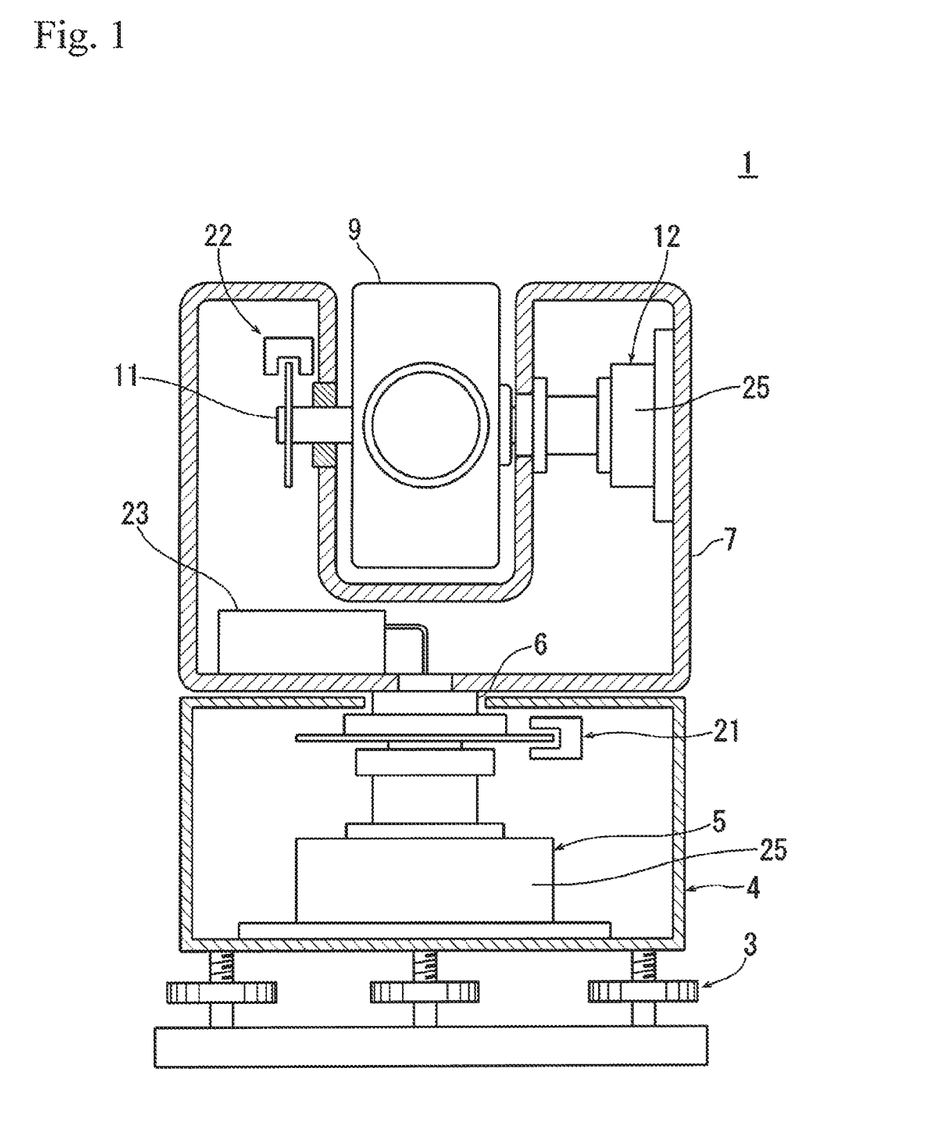
FIG. 1 is a schematic longitudinal sectional view of a surveying instrument according to the present embodiment.
Figure 2:
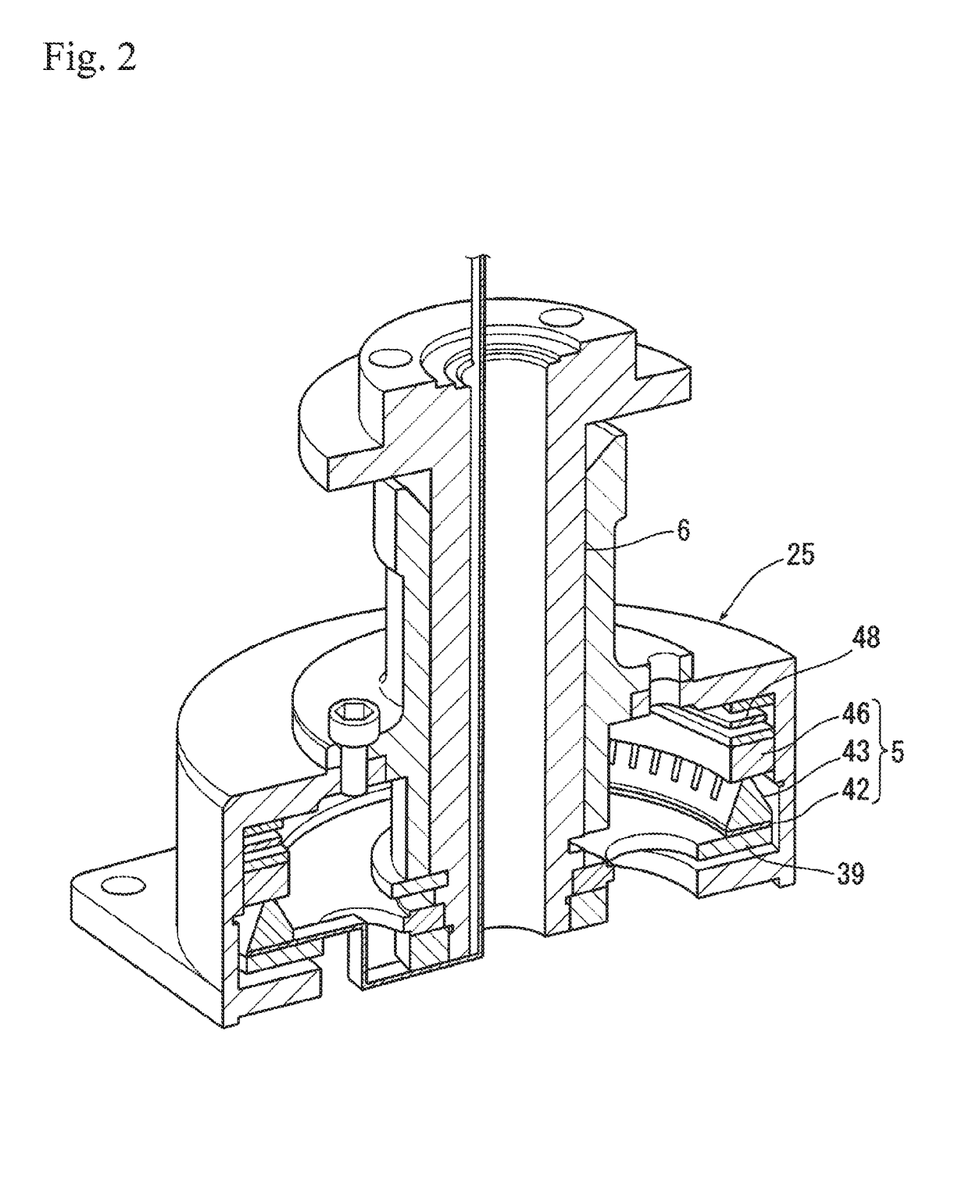
FIG. 2 is a sectional perspective view of a portion including an ultrasonic motor shown in FIG. 1.

FIG. 1 is a schematic longitudinal sectional view of a surveying instrument according to the present embodiment, and FIG. 2 is a sectional perspective view of a portion including an ultrasonic motor shown in FIG. 1. The reference numeral 1 denotes a surveying instrument, and the surveying instrument 1 includes a base 4 provided on a leveling portion 3, a bracket portion 7 that rotates horizontally around a horizontal rotary shaft 6 on the base 4, and a telescope 9 that is supported by the bracket portion 7 and rotates vertically around a vertical rotary shaft 11. In the bracket portion 7, a control unit 23 is housed. The surveying instrument 1 has an automatic collimation function and an automatic tracking function, and the telescope 9 houses a range-finding unit 61 and a light emitting unit 621, a light receiving unit 622, and an optical system 623 for a tracking unit 62 described below. By collaboration between horizontal rotation of the bracket portion 7 and vertical rotation of the telescope 9, range-finding light and tracking light are irradiated onto a target.

At a lower end portion of the horizontal rotary shaft 6, an ultrasonic motor 5 for horizontal rotation is provided, and at an upper end portion, an encoder 21 to detect a horizontal angle is provided. At one end portion of the vertical rotary shaft 11, an ultrasonic motor 12 for vertical rotation is provided, and at the other end portion, an encoder 22 to detect a vertical angle is provided. The encoders 21 and 22 are absolute encoders each including a rotary disc, a slit, a light emitting diode, and an image sensor. Other than absolute encoders, incremental encoders may be used.

Concerning configurations of the ultrasonic motors 5 and 12, configurations for vertical rotation and horizontal rotation are equivalent to each other, so that a configuration for horizontal rotation is mainly described. The ultrasonic motor 5 includes, as shown in FIG. 2, in a ring form, in order from the base portion 39, a piezoelectric ceramic 42 that generates vibration, a stator 43 that amplifies the vibration, a rotor 46 that interferes with the stator 43, and a wave washer 48 that presses the rotor 46 toward the stator 43 side. To the piezoelectric ceramic 42, a Sin electrode and a Cos electrode are attached, and when a drive voltage is alternately applied to these electrodes, the piezoelectric ceramic 42 ultrasonically vibrates. When the piezoelectric ceramic 42 vibrates, a wavelike traveling wave is formed in the stator 43, and due to friction caused by pressing of the wave washer 48, the stator 43 and the rotor 46 rotate relative to each other. In the horizontal ultrasonic motor 5, a motor case 25 is fixed to the base 4 and a rotor 46 is fixed to the motor case 25, so that when the stator 43 rotates, the horizontal rotary shaft 6 rotates integrally with the stator 43 via the base portion 39. In the vertical ultrasonic motor 12, a stator 43 is fixed to a motor case 25, and when a rotor 46 rotates, the vertical rotary shaft 11 rotates integrally with the rotor 46.

Figure 3:
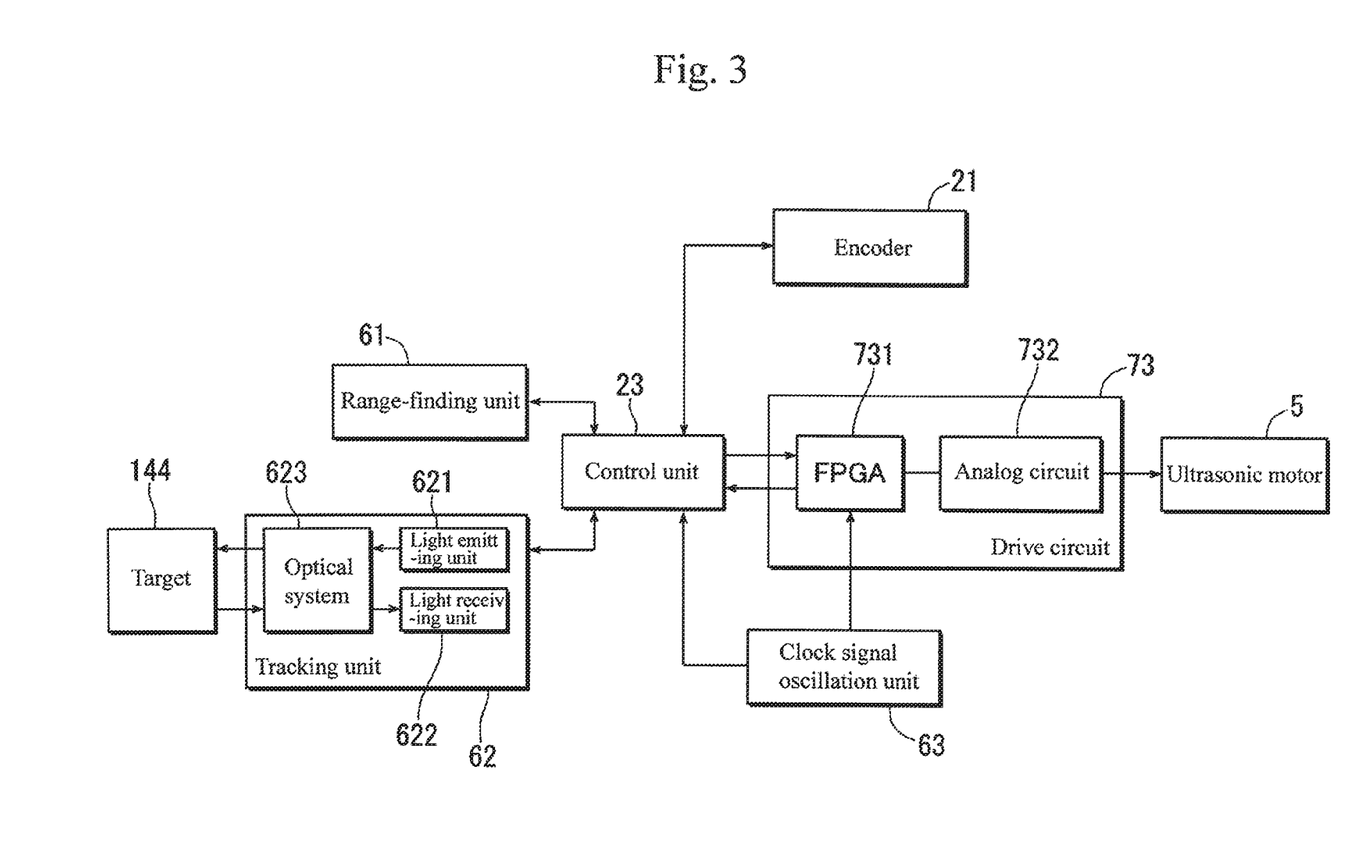
FIG. 3 is a control block diagram of the surveying instrument according to the present embodiment.

FIG. 3 is a control block diagram of a surveying instrument according to the present embodiment. Block diagrams of vertical rotation and horizontal rotation are equivalent to each other, so that the horizontal rotation is shown, and description on the vertical rotation is omitted. The surveying instrument 1 includes a control unit 23, an encoder 21, a range-finding unit 61, a tracking unit 62, a clock signal oscillation unit 63, a drive circuit 73, and the ultrasonic motor 5.

The control unit 23 consists of a microcontroller including a CPU, a ROM, and a RAM, etc., mounted on an integrated circuit. Software of the control unit 23 is changeable from an external personal computer that is not shown. The control unit outputs a drive signal to the ultrasonic motor 5 via the drive circuit 73. In addition, the control unit 23 controls the timing of light emission of the tracking unit 62. The control thereof is described in detail below.

The drive circuit 73 includes an FPGA (Field Programmable Gate Array) 731 and an analog circuit 732. Definition of an internal logic circuit of the FPGA 731 can be changed by the control unit 23 or an external device not shown. The FPGA 731 can generate a control signal at a variable drive frequency (drive signal frequency) and a variable amplitude, and can dynamically change the drive frequency and the amplitude. The analog circuit 732 includes a transformer, etc., and amplifies the control signal. The drive circuit 73 outputs the control signal from the FPGA 731 in response to a command from the control unit 23, and amplifies the control signal by the analog circuit 732 to generate two kinds of drive signals with different phases, and outputs these to the Sin electrode and the Cos electrode attached to the piezoelectric ceramic 42 of the ultrasonic motor 5. For the drive circuit 73, other PLDs (Programmable Logic Devices) such as an ASIC (Application Specific Integrated Circuit) may be used.

The clock signal oscillation unit 63 outputs a clock signal to the control unit 23 and the FPGA 731. The control unit 23 obtains a rotation speed of the rotary shaft 6 based on an angle signal obtained from the encoder 21, and determines a ratio of an acceleration period Ta in which the drive signal is applied and a deceleration period Tr in which the drive signal is stopped in a drive cycle TM, and gives a command about the ratio to the FPGA 731. That is, in continuous driving, the whole period is set to the acceleration period Ta so that the drive signal is continuously applied, and in intermittent driving, when it is desired to increase the rotation speed, the ratio of the acceleration period Ta is increased, and when it is desired to reduce the rotation speed, the ratio of the acceleration period Ta is decreased (the ratio of the deceleration period Tr is increased). In response to the command about the above-described ratio from the control unit 23, the FPGA 731 controls, based on a clock signal, the amplitude, the drive frequency, the drive cycles TM, the acceleration periods Ta, and the deceleration periods Tr of the drive signal. Accordingly, an average speed in the drive cycle TM changes, and the rotation speed of the rotary shaft 6 is fed-back in each drive cycle TM. Control information of the drive cycle TM, the acceleration period Ta, and the deceleration period Tr, prepared by the FPGA 731, are successively transmitted to the control unit 23.

Figure 4:
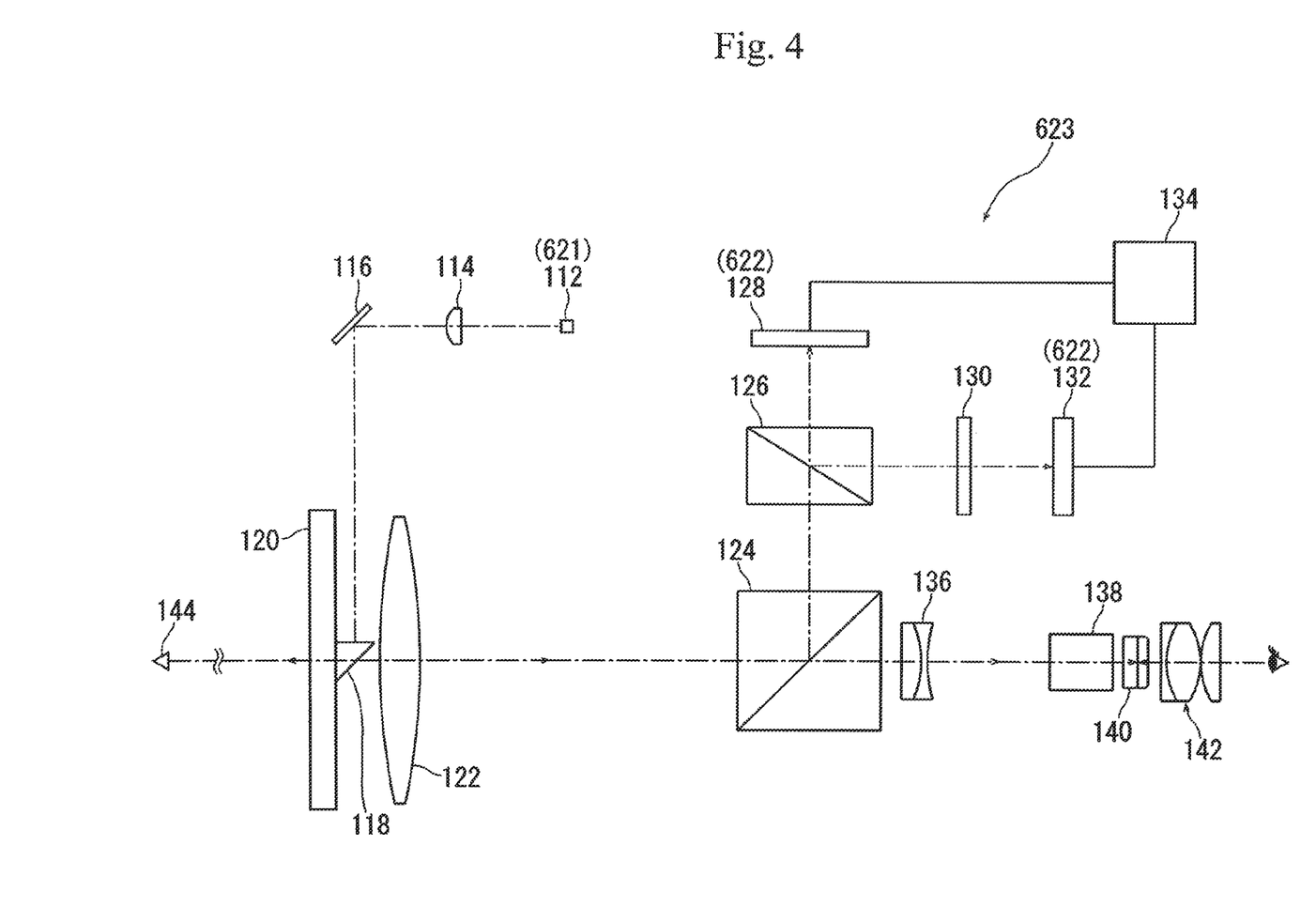
FIG. 4 is an optical block diagram showing configurations of a range-finding unit and a tracking unit of the surveying instrument according to the present embodiment.

FIG. 4 is an optical block diagram showing configurations of the range-finding unit 61 and the tracking unit 62 of the surveying instrument according to the present embodiment. FIG. 4 is an example of a configuration of the tracking unit 62, showing a configuration in which the range-finding unit 61 and the tracking unit 62 share a light emitting unit, a light receiving unit, and an optical system. The surveying instrument 1 may be configured so that each of the range-finding unit 61 and the tracking unit 62 includes a light emitting unit, a light receiving unit, and an optical system.

A light source 112 is a laser diode that emits, for example, infrared light as range-finding light or tracking light. Light emitted from the light source 112 is transmitted through a light transmission lens 114 and enters a reflecting mirror 116, enters a light transmission prism 118, and is then transmitted toward a target 144 via a parallel glass 120, and reflected on the target 144. The reflected light enters a dichroic prism 124 via the parallel glass 120 and an objective lens 122. A part of the reflected light is transmitted as collimation light through a focusing lens 136 and an erect prism 138 and forms an image on a focusing glass 140, and forms an image on an operator's retina via an eyepiece lens 142. The remainder of the reflected light enters a beam splitter 126 and is split. One of the split lights enters a first imaging element 128, and the other one of the split lights is transmitted through a wavelength filter 130 that removes infrared light, and then enters a second imaging element 132.

The first imaging element 128 and the second imaging element 132 are image sensors, for example, CCD sensors or CMOS sensors. Images imaged by the imaging elements 128 and 132 are transmitted to an image processing device 134 and subjected to image processing. A scenery image including infrared light of the light source 112 is imaged by the first imaging element 128, and a scenery image from which infrared light of the light source 112 is removed is imaged by the second imaging element 132. The image processing device 134 obtains a difference between the image of the first imaging element 128 corresponding to a lighted image and the image of the second imaging element 132 corresponding to an unlighted image. By obtaining the difference, a center of the image of the target 144 can be obtained. Operation results of the image processing device 134 are transmitted to the control unit 23, and the control unit 23 detects, as a target position, a position at which a deviation between the center of the image of the target 144 and a center of a visual axis of the telescope falls within a predetermined value, and performs automatic collimation and automatic tracking. In the description given above, the light source 122 serves as the light emitting unit 621 of the tracking unit 62, and the first imaging element 128 and the second imaging element 132 respectively serve as the light receiving unit 622 of the tracking unit 62. Each element of the optical system 623 may be altered based upon knowledge of a person skilled in the art. Processing by the image processing device 134 may be performed in the control unit 23.

By using the above-described configuration, the following control is performed in the surveying instrument 1. Hereinafter, although description about vertical rotation is also omitted, the same control as in the case of horizontal rotation is also performed for vertical rotation.

(First Control Method)

Figure 5:
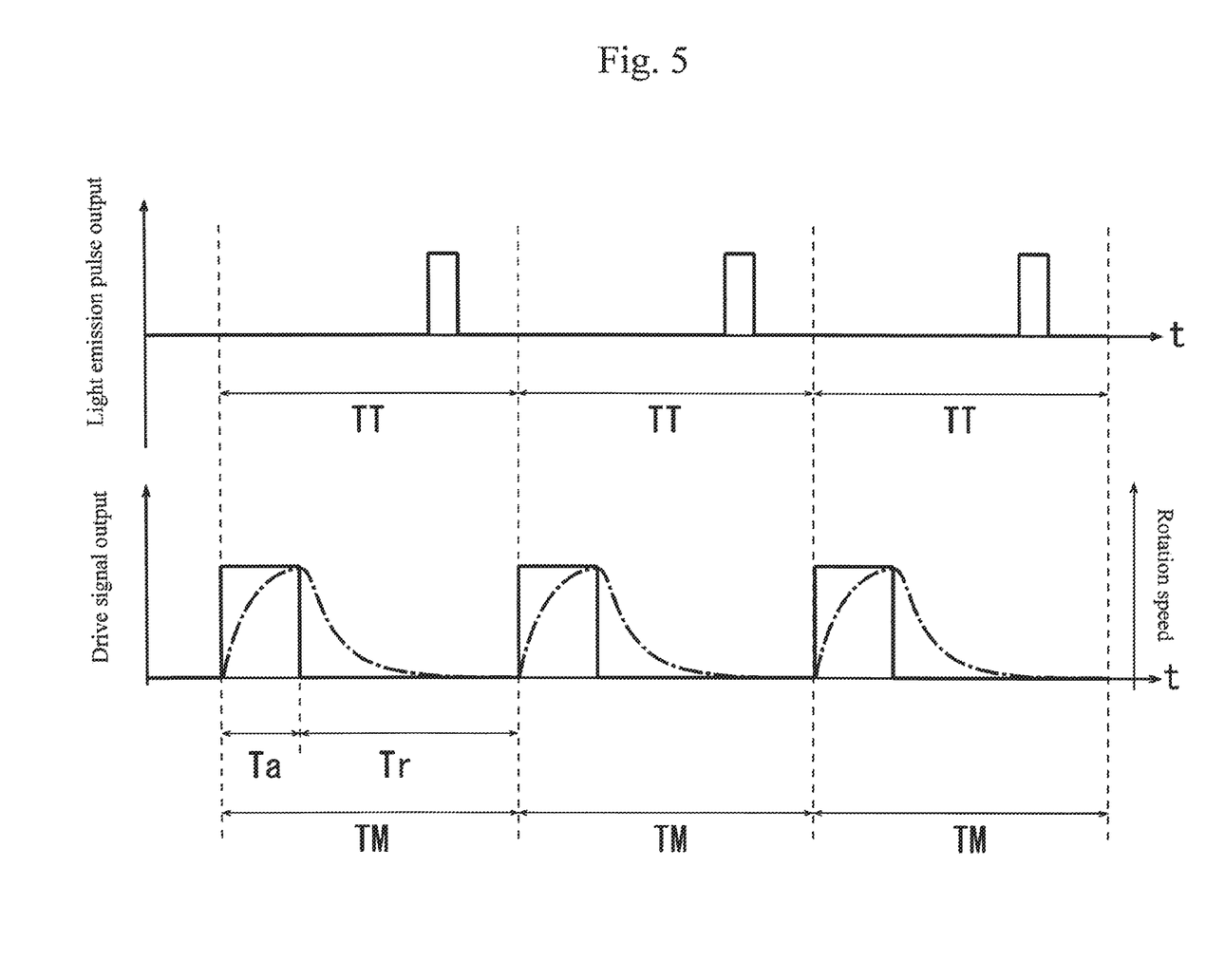
FIG. 5 is a timing chart relating to a first control method of the present embodiment.

FIG. 5 is a timing chart relating to a first control method of the present embodiment. The horizontal axes of FIG. 5 represent time t, the upper vertical axis represents an amplitude of a light emission pulse of the light emitting unit 621 of the tracking unit 62, the lower left vertical axis represents an amplitude (solid line) of a drive signal of the ultrasonic motor 5, and the lower right vertical axis represents a rotation speed (alternate long and short dashed line) of the rotary shaft 6.

The control unit 23 determines drive cycles TM of the ultrasonic motor 5 and light emission cycles TT of the light emitting unit 621 based on a clock signal from the clock signal oscillation unit 63. In the present embodiment, the drive cycles TM and the light emission cycles TT match each other.

The control unit 23 intermittently drives the ultrasonic motor 5 when it detects that the ultrasonic motor is in a low-speed rotation range (a speed range in which the ultrasonic motor cannot be continuously driven to rotate). In the present embodiment, the acceleration period Ta is provided concurrently with the start of the drive cycle TM. Therefore, the rotation speed of the rotary shaft 6 becomes slower toward the terminal end of the drive cycle TM. At this time, the control unit 23 makes the light emitting unit 621 emit light in the deceleration period Tr.

Thus, after the end of the acceleration period Ta of the ultrasonic motor 5, by emitting tracking light in the deceleration period Tr, reflected light of the tracking light can be received in the deceleration period Tr. That is, the target 144 can be imaged during deceleration, so that image blurring hardly occurs.

(Second Control Method)

Figure 6:
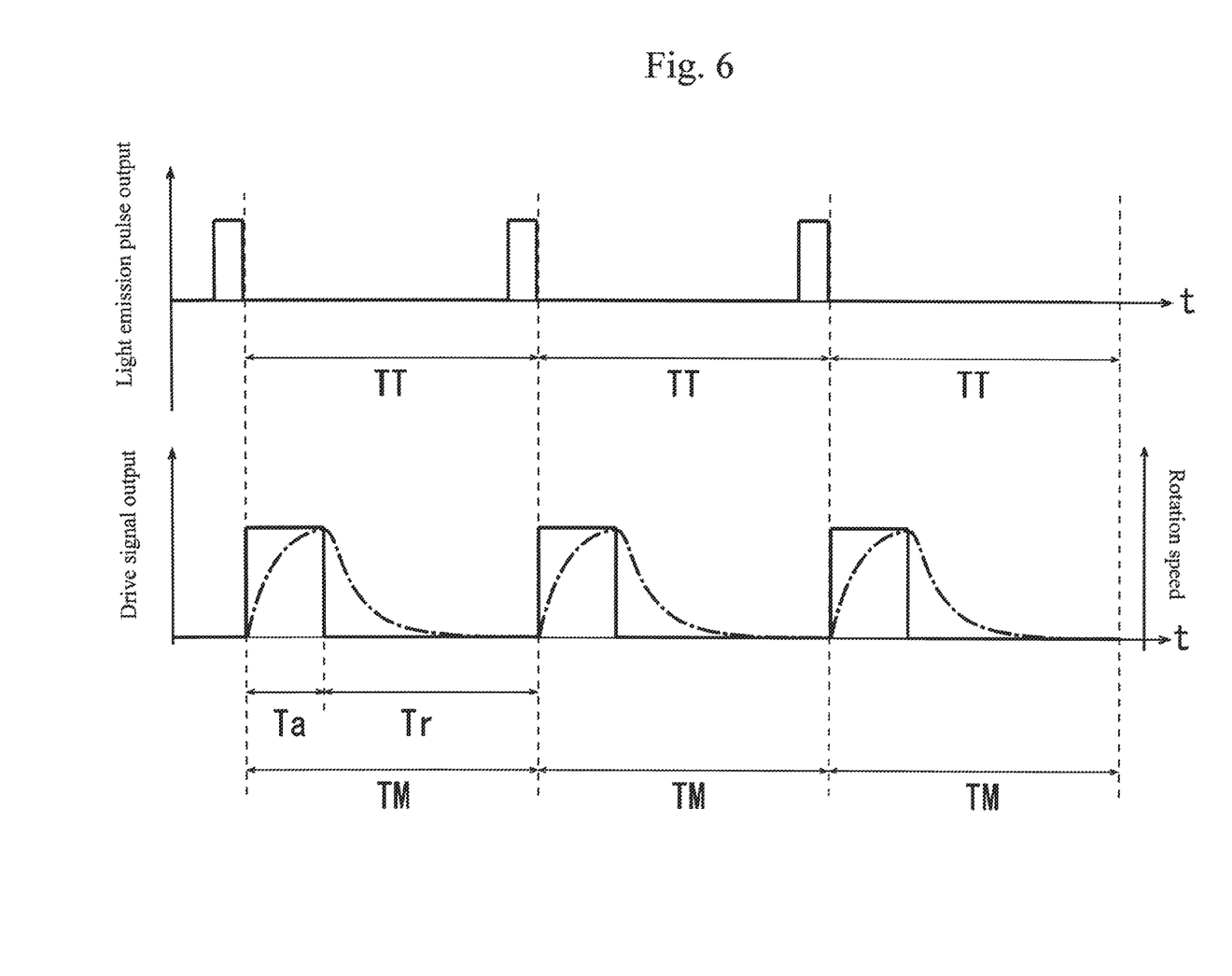
FIG. 6 is a timing chart relating to a second control method of the present embodiment.

FIG. 6 is a timing chart relating to a second control method of the present embodiment. The horizontal axes of FIG. 6 represent time t, the upper vertical axis represents an amplitude of a light emission pulse of the light emitting unit 621 of the tracking unit 62, the lower left vertical axis represents an amplitude (solid line) of a drive signal of the ultrasonic motor 5, and the lower right vertical axis represents a rotation speed (alternate long and short dashed line) of the rotary shaft 6. In the second control method as well, the acceleration period Ta is provided concurrently with the start of the drive cycle TM. At this time, the control unit 23 makes the light emitting unit 621 emit light in the deceleration period Tr just before switching to the next drive cycle TM (acceleration period Ta). Most preferably, the light emitting unit 621 is made to complete light emission in the deceleration period Tr just before switching to the next drive cycle TM (acceleration period Ta).

The rotation speed of the rotary shaft 6 becomes slower toward the terminal end of the deceleration period Tr. According to the present embodiment, at the end of the deceleration period Tr of the ultrasonic motor 5, tracking light can be emitted and reflected light can be received, so that when the rotation speed is lowest in the deceleration period Tr, the target 144 can be imaged. Therefore, image blurring is least likely to occur.

FIRST MODIFICATION

Figure 7:
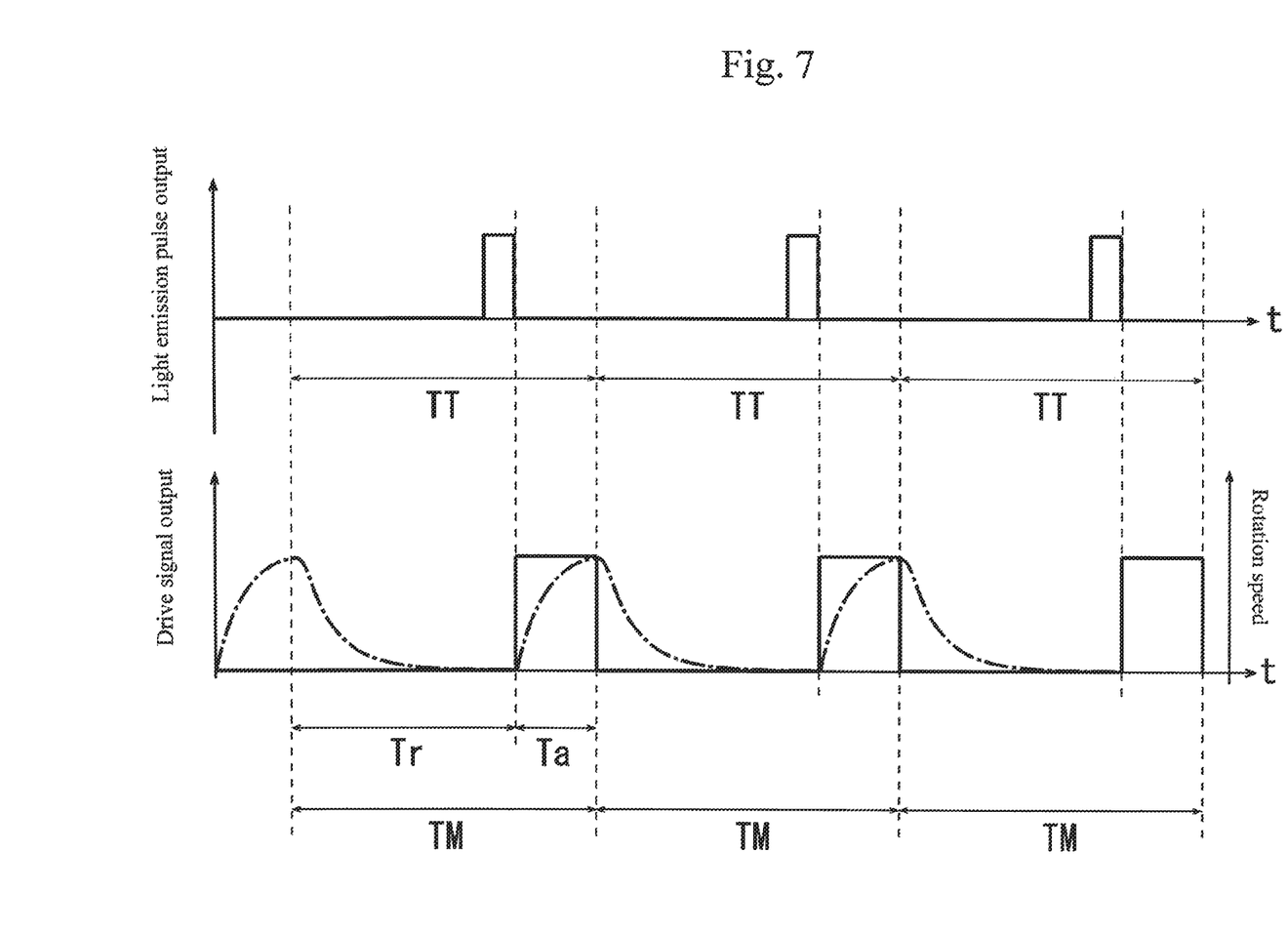
FIG. 7 is a timing chart relating to a first modification of the present embodiment.

FIG. 7 is a timing chart relating to a first modification of the present embodiment, showing a modification of the second control method. In the first modification, the acceleration period Ta is provided at the terminal end side of the drive cycle TM. Even in the case where the acceleration period Ta is provided in the latter half, the control unit 23 makes the light emitting unit 621 complete light emission in the deceleration period Tr just before switching to the acceleration period Ta.

The timing of light emission of the light emitting unit 621 is thus changed according to arrangement of the deceleration period Tr and the acceleration period Ta of the ultrasonic motor 5. Even when the arrangement of the deceleration period Tr and the acceleration period Ta of the ultrasonic motor 5 is changed, by emitting and receiving tracking light in the deceleration period Tr of the ultrasonic motor 5 just before switching to the acceleration period Ta, similar effects as in the second control method can be obtained.

SECOND MODIFICATION

Figure 8:
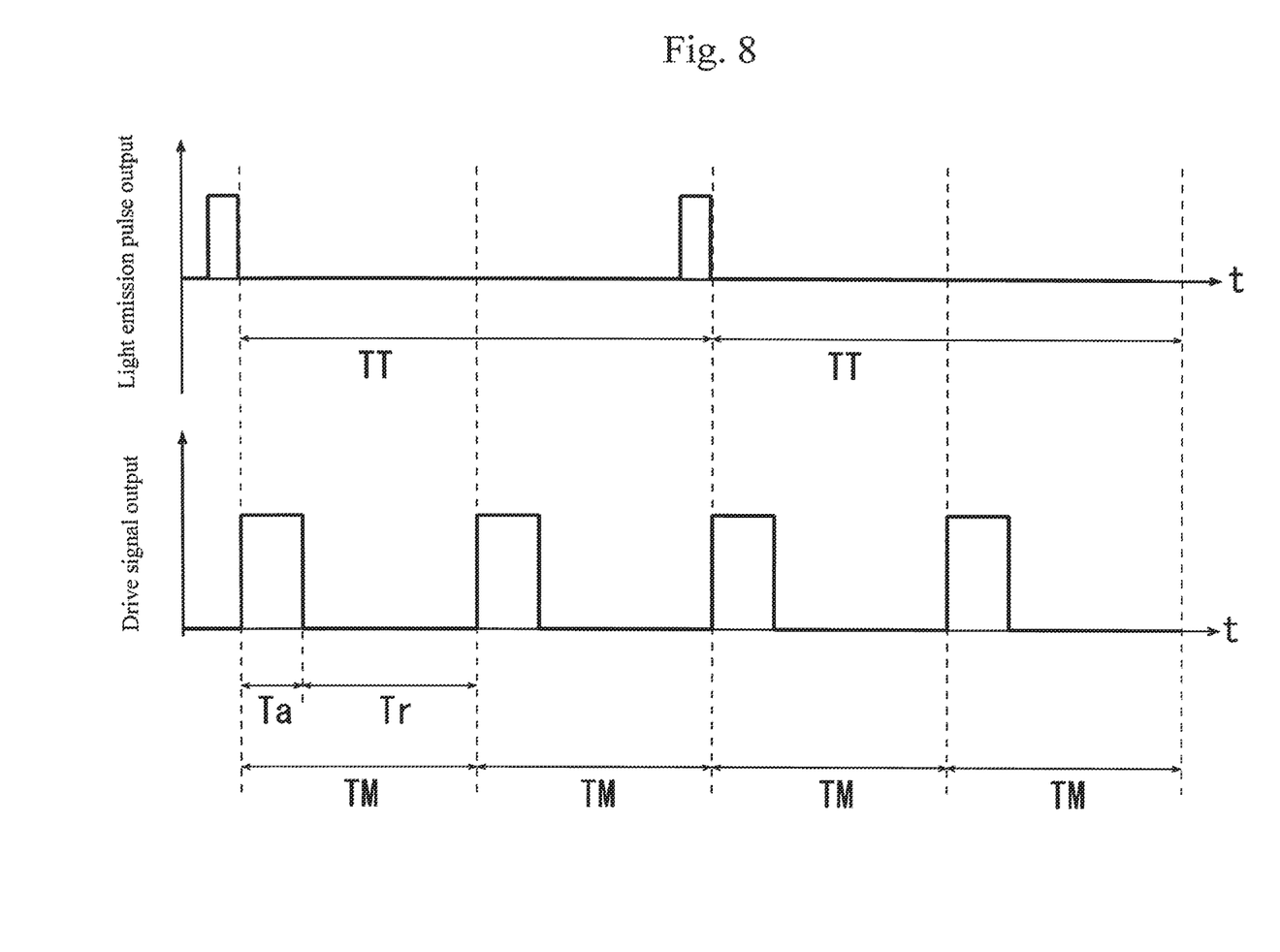
FIG. 8 is a timing chart relating to a second modification of the present embodiment.

FIG. 8 is a timing chart relating to a second modification of the present embodiment, showing a modification of the second control method. In the second modification, based on a clock signal from the clock signal oscillation unit 63, the control unit 23 sets the ratio of the drive cycles TM of the ultrasonic motor 5 to the light emission cycles TT of the light emitting unit 621 to 1:2. Thereafter, the control unit 23 makes the light emitting unit 621 complete light emission in the deceleration period Tr just before switching to the acceleration period Ta.

Thus, the ratio of the drive cycles TM of the ultrasonic motor 5 to the light emission cycles TT of the light emitting unit 621 may be set to 1:N or N:1 (N is a natural number other than 1). By setting the ratio of the drive cycles TM to the light emission cycles TT to 1:N or N:1, similar effects as in the second control method can be obtained even when the cycles cannot be accurately matched due to constraints of electronic devices.

THIRD MODIFICATION

Figure 9:
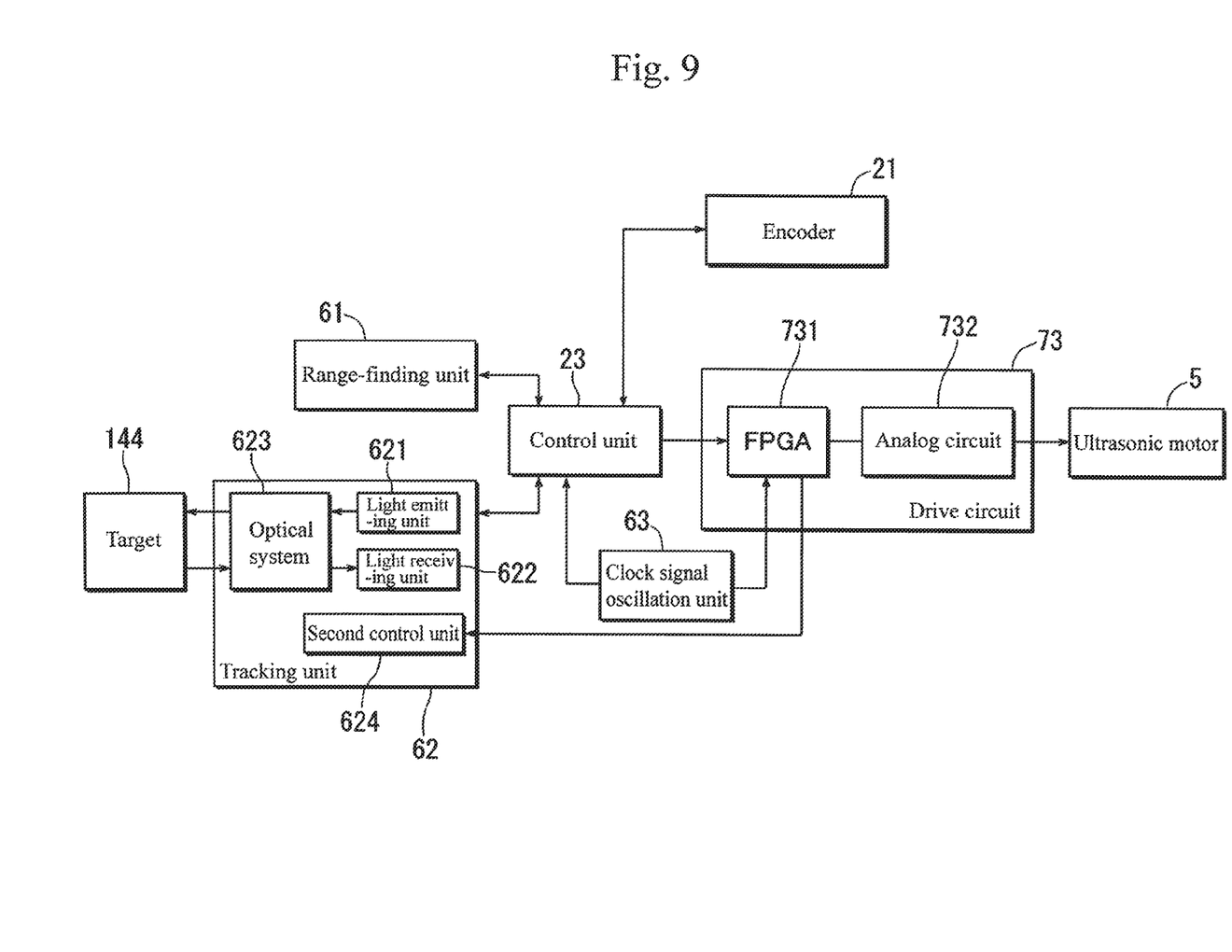
FIG. 9 is a control block diagram relating to a third modification of the present embodiment.

FIG. 9 is a control block diagram relating to a third modification of the present embodiment, showing a modification of the configuration of the surveying instrument 1 shown in FIG. 3. In the configuration shown in FIG. 3, the FPGA 731 controls the drive cycles TM, the acceleration periods Ta, and the deceleration periods Tr in response to a command from the control unit 23, and transmits control information of these to the control unit 23, however, the FPGA may transmit the control information to the tracking unit 62 without using the control unit 23. That is, it is also possible that the tracking unit 62 is provided with a second control unit 624, control information is directly transmitted to the second control unit 624, and the second control unit 624 performs a role of making synchronization.

According to the embodiment and modifications described above, by synchronizing the ultrasonic motor 5 with the tracking unit 62, blurring of an image acquired through automatic tracking can be reduced. Accordingly, a received light amount in the light receiving unit 622 can be prevented from decreasing, so that the tracking performance can be prevented from deteriorating.

The embodiment and modifications described above can be combined based on knowledge of a person skilled in the art, and such alteration is included in the aim of the present invention.

DESCRIPTION OF REFERENCE NUMERALS

1 Surveying instrument
5, 12 Ultrasonic motor
6, 11 Rotary shaft
62 Tracking unit
621 Light emitting unit
622 Light receiving unit
23 Control unit
63 Clock signal oscillation unit TM Drive cycle
TT Light emission cycle
Ta Acceleration period
Tr Deceleration period

What is claimed is:

1. A method for controlling an ultrasonic motor in a surveying instrument including a rotary shaft, an ultrasonic motor that drives the rotary shaft, a tracking unit that includes a light emitting unit and a light receiving unit and tracks a target, a clock signal oscillation unit that outputs a clock signal, and a control unit that outputs a drive signal to the ultrasonic motor and controls the timing of light emission of the tracking unit, wherein at the time of low-speed rotation of the ultrasonic motor,
the control unit performs intermittent driving, such that in the intermittent driving, an acceleration period in which the drive signal is applied and a deceleration period in which the drive signal is stopped are respectively provided once in a driving cycle of the drive signal, and
the control unit synchronizes the ultrasonic motor and the tracking unit based on the clock signal, sets a ratio of the acceleration period and the deceleration period in the drive cycle of the drive signal, and makes the light emitting unit of the tracking unit emit light and the light receiving unit receive the light only in the deceleration period after the termination of the drive signal toward the end of the drive cycle and images the target only in the deceleration period before outputting a subsequent drive signal and switching to a subsequent acceleration period in each of all of the drive cycles so as to avoid the occurrence of a blurring image.

2. The surveying instrument according to claim 1, wherein the control unit makes the light emitting unit light in the deceleration period just before switching to the acceleration period.

3. The method for controlling an ultrasonic motor according to claim 1, wherein the light emitting unit is made to light in the deceleration period when a rotation speed of the ultrasonic motor is substantially constant.

4. A surveying instrument comprising:
a rotary shaft;
an ultrasonic motor that drives the rotary shaft;
a tracking unit that includes a light emitting unit and a light receiving unit and tracks a target;
a clock signal oscillation unit that outputs a clock signal; and
a control unit that outputs a drive signal to the ultrasonic motor and controls the timing of light emission of the tracking unit, wherein at the time of low-speed rotation of the ultrasonic motor,
the control unit performs intermittent driving, such that in the intermittent driving, an acceleration period in which the drive signal is applied and a deceleration period in which the drive signal is stopped are respectively provided once in a driving cycle of the drive signal, synchronizes the ultrasonic motor and the tracking unit based on the clock signal, sets a ratio of the acceleration period and the deceleration period in the drive cycle of the drive signal, and makes the light emitting unit of the tracking unit emit light and the light receiving unit receive the light only in the deceleration period after the termination of the drive signal toward the end of the drive cycle and images the target only in the deceleration period before outputting a subsequent drive signal and switching to a subsequent acceleration period in each of all of the drive cycles so as to avoid the occurrence of a blurring image.

5. The surveying instrument according to claim 4, wherein the control unit makes the light emitting unit light in the deceleration period just before switching to the acceleration period.

6. The surveying instrument according to claim 4, wherein the light emitting unit is made to light in the deceleration period when a rotation speed of the ultrasonic motor is substantially constant.

* * * * *